(12) United States Patent
Bortone et al.

(10) Patent No.: US 7,293,974 B2
(45) Date of Patent: Nov. 13, 2007

(54) APPARATUS FOR PRODUCING A CURLY PUFF EXTRUDATE

(75) Inventors: Eugenio Bortone, Frisco, TX (US); Daniel Eugene Orr, Addison, TX (US); Devang Jitendra Sutaria, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 610 days.

(21) Appl. No.: 10/919,642

(22) Filed: Aug. 17, 2004

(65) Prior Publication Data

US 2005/0019467 A1    Jan. 27, 2005

Related U.S. Application Data

(62) Division of application No. 10/270,756, filed on Oct. 15, 2002, now Pat. No. 6,797,213.

(51) Int. Cl.
*A21C 3/04* (2006.01)
*A21C 11/12* (2006.01)

(52) U.S. Cl. ............... 425/297; 425/291; 425/311; 425/313; 425/377; 426/516; 426/518

(58) Field of Classification Search ........... 425/291, 425/297, 310, 311, 312, 313, 314, 377; 426/516, 426/518
See application file for complete search history.

(56) References Cited

U.S. PATENT DOCUMENTS

| | | | |
|---|---|---|---|
| 3,215,094 A * | 11/1965 | Oldershaw et al. | 426/512 |
| 3,444,826 A * | 5/1969 | Seeder et al. | 425/71 |
| 3,847,531 A | 11/1974 | McComb | |
| 4,056,593 A | 11/1977 | de Navas Albareda | |
| 4,097,213 A | 6/1978 | McComb et al. | |
| 4,264,635 A | 4/1981 | Wilde | |
| 4,288,463 A | 9/1981 | Groff et al. | |
| 4,290,989 A | 9/1981 | Topor et al. | |
| 4,353,498 A | 10/1982 | Scarberry et al. | |
| 4,698,004 A | 10/1987 | Ramnarine | |
| 4,802,838 A * | 2/1989 | Schaaf | 425/311 |
| 4,803,091 A | 2/1989 | Mottur et al. | |
| 4,888,192 A | 12/1989 | Ramnarine | |

(Continued)

FOREIGN PATENT DOCUMENTS

EP    0 223 884 A1    6/1987

*Primary Examiner*—Robert B. Davis
*Assistant Examiner*—Joseph Leyson
(74) *Attorney, Agent, or Firm*—Colin P. Cahoon; Chad E. Walter; Carstens & Cahoon, LLP

(57) ABSTRACT

Apparatus for cutting a puff extrudate utilizing a blade that passes through the extrudate while the extrudate is in a viscous melt stage. The present invention utilizes a tube to facilitate production of a curly puff extrudate. A gap is provided in between the tube and the extruder die to allow a blade to access the extrudate as it exits an orifice in the die. The blade accesses the extrudate at the viscous melt stage, before the extrudate has cooled and hardened. The blade nicks the extrudate, as opposed to completely cutting it, which allows the extrudate to remain connected throughout processing such as curling in the containment tube. The gap also allows steam to be vented form the extrudate as it exits the orifice in the die. The nicked extrudate separates when fried or baked.

23 Claims, 5 Drawing Sheets

U.S. PATENT DOCUMENTS

| | | | |
|---|---|---|---|
| 5,266,260 A * | 11/1993 | Hentschel | 264/310 |
| 5,435,714 A | 7/1995 | Van Lengerich et al. | |
| 5,637,341 A | 6/1997 | Rivlin | |
| 5,641,529 A | 6/1997 | Kunas | |
| 5,888,558 A * | 3/1999 | Janot et al. | 425/313 |
| 5,888,567 A | 3/1999 | Daouse | |
| 6,086,352 A | 7/2000 | McFarland | |
| 6,299,774 B1 * | 10/2001 | Ainsworth et al. | 210/603 |
| 6,607,772 B1 * | 8/2003 | Bortone | 426/516 |
| 6,770,233 B2 * | 8/2004 | Bortone et al. | 264/167 |

* cited by examiner

APPARATUS FOR PRODUCING A CURLY PUFF EXTRUDATE

This application is a divisional of U.S. application Ser. No. 10/270,756 filed on Oct. 15, 2002, and issued as U.S. Pat. No. 6,797,213.

BACKGROUND OF THE INVENTION

1. Technical Field

The present invention relates generally to the production of a puff extrudate and, specifically, to an improved process of producing a plurality of similarly shaped curly puff extrudate pieces from a single curly puff extrudate.

2. Description of Related Art

The production in the prior art of a puff extruded product, such as snacks produced and marketed under the Cheetos™ brand label, typically involves extruding a corn meal or other dough through a die having a small orifice at extremely high pressure. The dough flashes or puffs as it exits the small orifice, thereby forming a puff extrudate. The typical ingredients for the starting dough may be, for example, corn meal of 41 pounds per cubic foot bulk density and 12 to 13.5% water content by weight. However, the starting dough can be based primarily on wheat flour, rice flour, soy isolate, soy concentrates, any other cereal flours, protein flour, or fortified flour, along with additives that might include lecithin, oil, salt, sugar, vitamin mix, soluble fibers, and insoluble fibers. The mix typically comprises a particle size of 100 to 1200 microns.

The puff extrusion process is illustrated in FIG. 1, which is a schematic cross-section of a die 12 having a small diameter exit orifice 14. In manufacturing a corn-based puff product, corn meal is added to, typically, a single (i.e., American Extrusion, Wenger, Maddox) or twin (i.e., Wenger, Clextral, Buhler) screw-type extruder such as a model X 25 manufactured by Wenger or BC45 manufactured by Clextral of the United States and France, respectively. Using a Cheetos like example, water is added to the corn meal while in the extruder, which is operated at a screw speed of 100 to 1000 RPM, in order to bring the overall water content of the meal up to 15% to 18%. The meal becomes a viscous melt 10 as it approaches the die 12 and is then forced through a very small opening or orifice 14 in the die 12. The diameter of the orifice 14 typically ranges between 2.0 mm and 12.0 mm for a corn meal formulation at conventional moisture content, throughput rate, and desired extrudate rod diameter or shape. However, the orifice diameter might be substantially smaller or larger for other types of extrudate materials.

While inside this orifice 14, the viscous melt 10 is subjected to high pressure and temperature, such as 600 to 3000 psi and approximately 400° F. Consequently, while inside the orifice 14, the viscous melt 10 exhibits a plastic melt phenomenon wherein the fluidity of the melt 10 increases as it flows through the die 12.

It can be seen that as the extrudate 16 exits the orifice 14, it rapidly expands, cools, and very quickly goes from the plastic melt stage to a glass transition stage, becoming a relatively rigid structure, referred to as a "rod" shape if cylindrical, puff extrudate. This rigid rod structure can then be cut into small pieces, further cooked by, for example, frying, and seasoned as required.

Any number of individual dies 12 can be combined on an extruder face in order to maximize the total throughput on any one extruder. For example, when using the twin screw extruder and corn meal formulation described above, a typical throughput for a twin extruder having multiple dies is 2,200 lbs., a relatively high volume production of extrudate per hour, although higher throughput rates can be achieved by both single and twin screw extruders. At this throughput rate, the velocity of the extrudate as it exits the die 12 is typically in the range of 1000 to 4000 feet per minute, but is dependent on the extruder throughput, screw speed, orifice diameter, number of orifices and pressure profile.

As can be seen from FIG. 1, the snack food product produced by such process is necessarily a linear extrusion which, even when cut, results in a linear product. Consumer studies have indicated that a product having a similar texture and flavor presented in a "curl," "spiral," or "coil spring" shape (all of which terms are used synonymously by Applicant herein) would be desirable. An example of such spiral shape of such extrudate is illustrated in FIG. 2, which is a perspective view of one embodiment of a spiral or curl shaped puff extrudate 20. The apparatus for making curly puff extrudate is the subject matter of U.S. pat. No. 6,722,873 entitled "Apparatus and Method for Producing a Curly Puff Extrudate" and is incorporated herein by reference.

Curly puff extrudate 20 has proven difficult to cut into smaller, more manageable extrudate pieces. Some type of containment vessel such as a pipe or tube (terms used synonymously by the Applicant herein) is used for the curly puff extrudate production and a cutting device at the end of the tube results in surging and plugging within the tube, particularly during start-up and shutdown of the extruder. FIG. 3 illustrates a perspective view of a device involving a number of tubes 30 attached to a die face 18. The exit end of each tube 30 is attached to an extruder face 23. This arrangement then permits the attachment to the extruder face 23 of a circular cutting apparatus 24 having a number of individual cutting blades 26. Such an arrangement is shown with ten tubes 30 connected to a die face 18. Although not shown in FIG. 3, the tube 30 and extruder face 23 configuration can be designed such that the dies 12 are allowed to vent until specific conditions are met (such as extrudate bulk density, specific mechanical energy, moisture content, screw speed, and die pressure), then the tube 30 can be rotated over the dies 12 by device of an additional rotatable plate (not shown) between the tubes 30 and the dies 12.

However, cutting the curly puff extrudate 20 at the end of the tube 30 in a multiple tube 30 assembly is not preferable because the cutting blades 26 drag the curly puff extrudate 20 from one tube 30 to another which results in jagged and non-uniform ends of individual curly puff extrudate 20 pieces. FIG. 4 is an example of a piece of curly puff extrudate 20 cut with a device similar to the one in FIG. 3. Additionally, when the curly puff extrudate 20 is produced in a multiple tube assembly, the tubes may not produce extrudate at the same rate, so a single cutter cutting multiple tubes will produce curly puff extrudate pieces of differing lengths.

This problem can be overcome by completely severing the extrudate at the die face when it is in the plastic melt state rather than the glass transition state. However, severing the extrudate at the die face disconnects the individual extrudate pieces and it is sometimes preferable to keep the extrudate connected for processing before separating the extrudate into individual extrudate pieces. Examples of processing include: conveying, seasoning, stretching, separating, or confining the extrudate in a containment vessel. Therefore, a need exists for an effective method of cutting the extrudate in the plastic melt state without completely separating the extrudate Another problem with the apparatus in FIG. 3 is that it does not allow for the release of steam and other hot gasses released from the expanding extrudate. The steam and other gasses promote surging and plugging within the tube. Therefore, a need also exists for an apparatus and method for venting steam and other hot gasses so they cannot enter the containment device.

It should be understood that while a need exist for an apparatus capable of cutting a curly puff extrudate without plugging a containment tube, the need is not limited to curly puff extrudate. A need also exists for an apparatus for cutting a sinusoidal puff extrudate as well as other types of linear and non-linear puffed extrudates.

Consequently, a need exists for an apparatus and method of cutting the puff extrudate into smaller puff extrudate pieces that will create smooth cuts at each end of the individual pieces. A need also exists for an apparatus and method that will prevent plugging of the tube during start-up, operation, and shutdown of the extruder. A need further exists for a method of releasing steam from the expanding extrudate. Moreover, a need exists for an apparatus and method of controlling the length of the individually cut puff extrudate pieces in a configuration with multiple orifices for each die.

SUMMARY OF THE INVENTION

The present invention comprises a nicking blade apparatus that nicks the curly puff extrudate rather than cutting it. The nicks create a series of weak points in the curly puff extrudate. The weak points are strong enough to keep the curly puff extrudate connected during the conveying process. However, when the curly puff extrudate is further processed in an oven or fryer, the curly puff extrudate breaks at the nicks, separating the curly puff extrudate into individual pieces.

In order to properly facilitate the nicking process while the extrudate is in the plastic melt state, the nicking should occur as close to the diehead as possible. The tube is separated from the diehead so that a blade may access the diehead orifice. The resulting separation also allows steam from the expanding extrudate to vent instead of proceeding through the tube. The release of steam allows the curly puff extrudate to flow more smoothly through the tube and helps prevent plugging and surging.

The proposed invention also comprises a tube positioning device that positions the tube over the diehead orifice during operation, but removes the tube away from the diehead orifice during start-up and shutdown. Removal of the tube from over the orifice is desired during start-up and shutdown because the extrudate tends to surge during these periods and plugs the tube. In order to facilitate nicks of different depths, a blade positioning device is also disclosed.

The preferred embodiment of the present invention utilizes a nicking blade for every orifice. However, as some die configurations will not allow a nicking blade for every orifice, a central blade apparatus for nicking multiple orifices is also disclosed.

The preferred embodiment of the present invention also utilizes an oven or fryer to separate the nicked curly puff extrudate. However, under certain circumstances, an oven or fryer is not preferable, so alternate separation devices are also disclosed. Alternative separation devices include a paddle wheel, a vibrating conveyer, and a tumbler.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
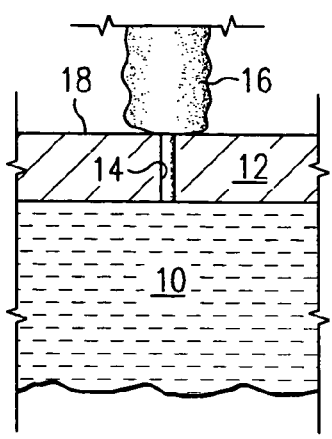
FIG. 1 is a schematic cross-section of a prior art puff extrudate die.
Figure 2:
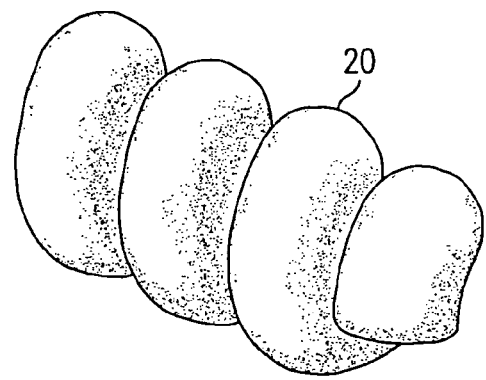
FIG. 2 is a perspective view of a length of curly puff extrudate product.
Figure 3:
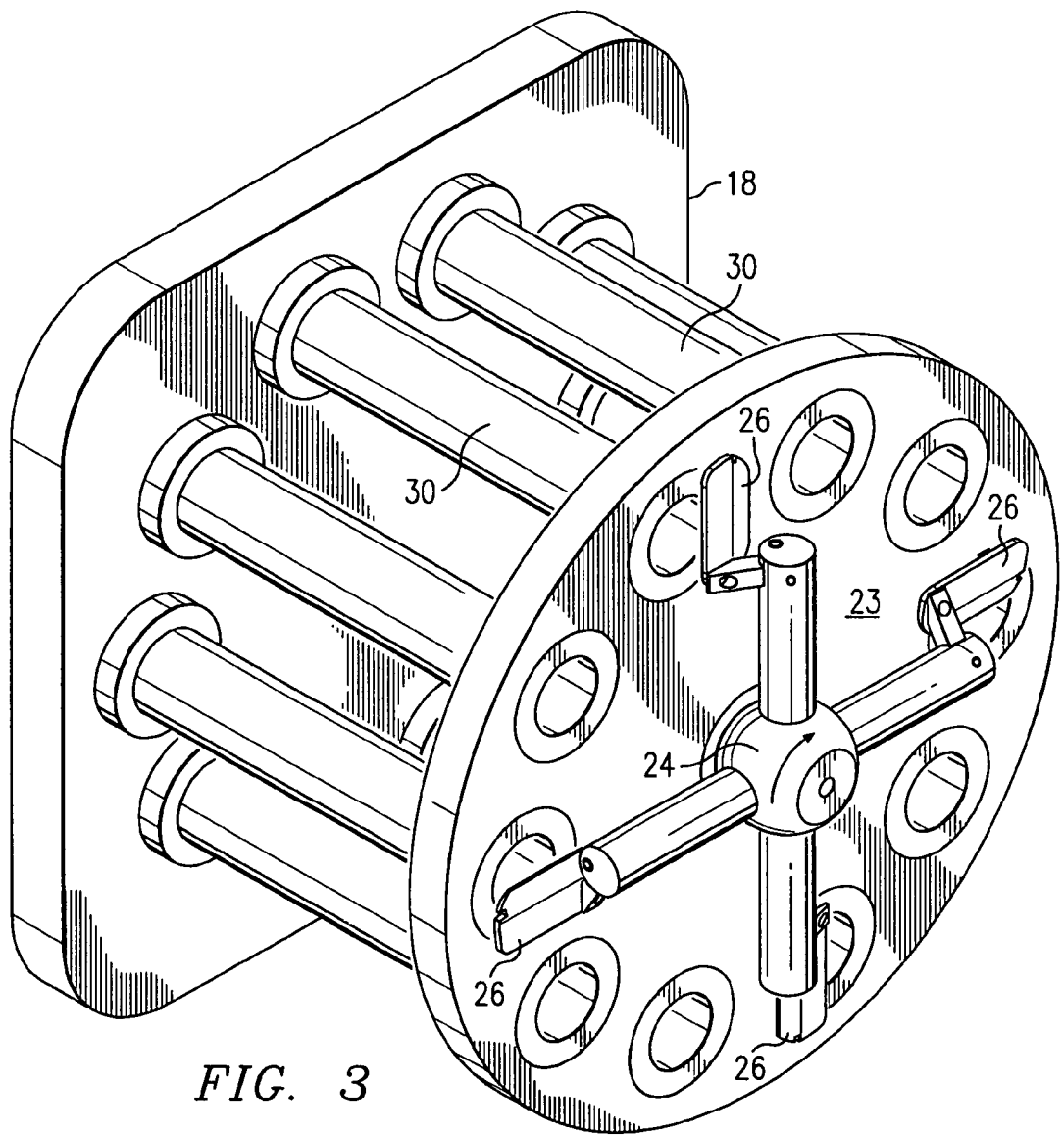
FIG. 3 is a perspective view of a puff extrudate face cutter applied to the curly puff extrudate production apparatus as disclosed in U.S. patent application Ser. No. 09/952,574.
Figure 4:
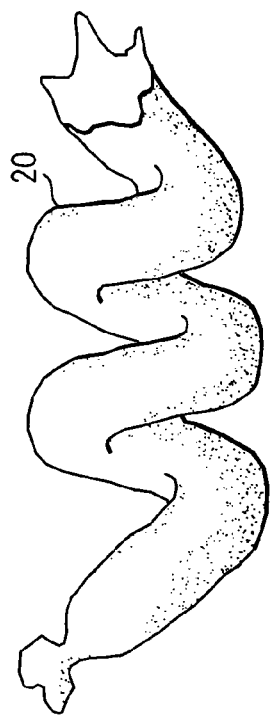
FIG. 4 is a perspective view of a piece of curly puff extrudate cut using a puff extrudate face cutter.
Figure 5:
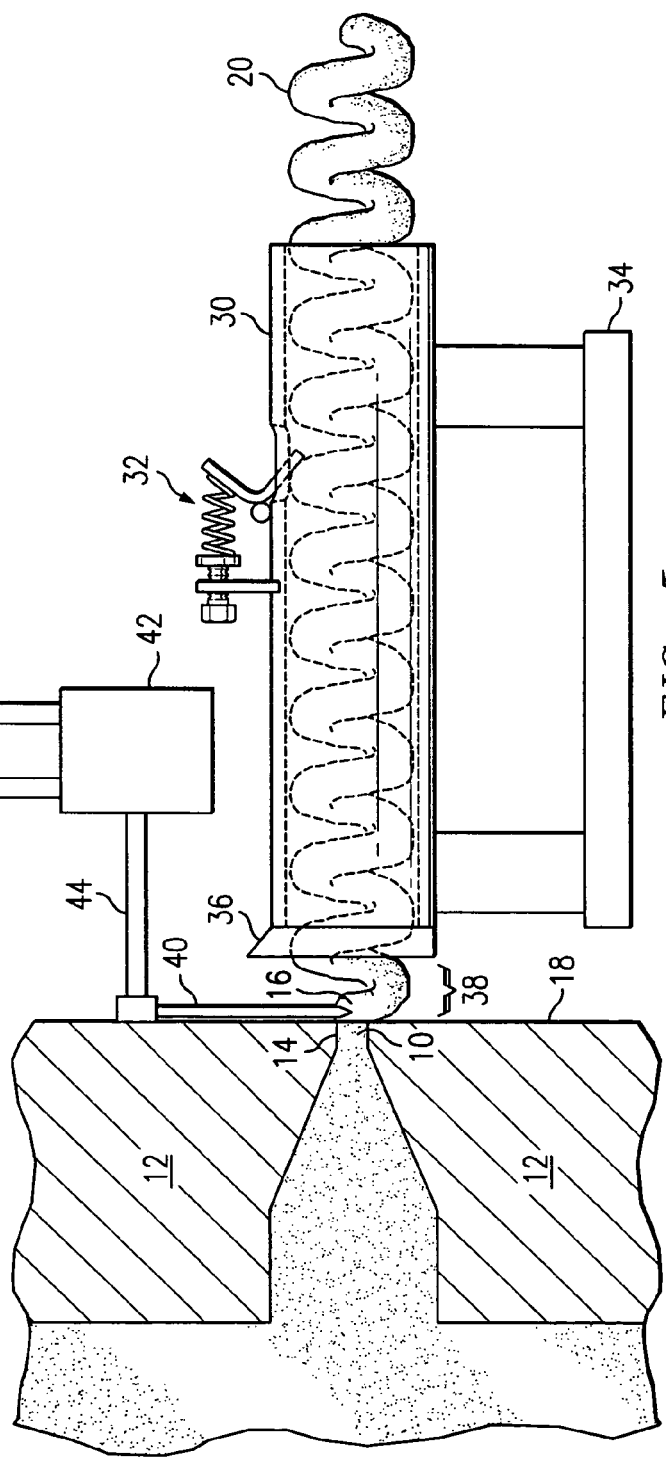
FIG. 5 is a side view in elevation of one embodiment of the present invention.

FIG. 5 is an elevation view of one embodiment of the present invention. Identical reference numerals will be used to identify identical elements throughout all of the drawings, unless otherwise indicated. As with the prior art, the extrudate 16 exits an orifice 14 in the die 12. The cross-sectional diameter of the orifice 14 is dependent on the specific dough formulation, throughput rate, and desired rod (or other shape) diameter, but is preferred in the range of 1 mm to 14 mm. (The orifice 14 diameter is also dependent on the mean particle size of the corn meal or formula mix being extruded.)

If a curly puff extrudate 20 is desired, a tube 30 with a flapper 32 can be used. A flapper 32 puts pressure on the extrudate 16 exiting the orifice 14 so that curls will form in the extrudate 16. A tube positioning device 34 is used to position the tube 30 in front of or away from the orifice 14. The tube positioning device 34 is capable of moving the tube 30 in any direction relative to the die 12. Examples of tube positioning devices are electrical servo motors, pneumatic actuators, hydraulic actuators, and mechanical screws. A tube blade 36 is also affixed to the end of the tube 30 closest to the die 12.

A nicking blade 40 is positioned flush with the die face 18 and either rotates or oscillates about a shaft 44. The nicking blade 40 and the shaft 44 are powered by a motor 42, which is connected to a blade positioning device 46. The blade positioning device 46 is capable of moving the motor 42, the shaft 44, and the nicking blade 40 in any direction relative to the die 12. Examples of blade positioning devices 46 are electrical servo motors, pneumatic actuators, hydraulic actuators, and mechanical screws. In order to effectively nick the extrudate 16 exiting the orifice 14, the nicking blade 40 is positioned such that the end of the nicking blade 40 only partially covers the orifice 14 when passing in front of the orifice 14. Allowing the nicking blade 40 to completely cover the orifice 14 would completely sever the extrudate 16, which would not allow the extrudate 16 to remain connected for additional processing. It should be understood that the extent to which the nicking blade 40 covers the orifice 14 determines the depth of the nick in the extrudate 16. Deeper nicks will allow the extrudate 16 to break more easily, a property referred to here as breakability. Shallower nicks will allow the extrudate 16 to stay connected more easily, a property referred to here as connectivity. The amount of coverage over the orifice 14 is expressed as a coverage percentage that is equal to the length of the nicking blade 40 covering the orifice 14 divided by the orifice 14 cross-sectional diameter. The coverage percentage desired will depend on the type of viscous melt 10 and orifice 14 size. Coverage percentages of eighty to ninety percent have generally been found to be an acceptable balance between breakability and connectivity for the melt 10 and orifice 14 size described herein. If desired, the rate at which the nicking blade 40 nicks the extrudate 16 can be increased such that the nicking blade 40 nicks the extrudate 16 faster than the extrudate 16 curls. When this is done and the nicked extrudate 16 is separated, smaller "C" shaped pieces of extrudate are formed.

Another factor affecting the nick size is the nicking blade 40 tip shape. While pointed nicking blades 40 are capable of nicking the extrudate 16, square edged nicking blades 40 (i.e. where the edge of the nicking blade 40 contains two ninety degree angles) have proven more effective at creating uniform nicks in the curly puff extrudate 20.

During start up, the tube 30 is positioned away from the orifice 14 with the tube blade 36 placed firmly against the die face 18. As the extruder starts and approaches operating parameters, it will extrude undesirable extrudate 16. The extruder also extrudes an excess amount of hot gasses, such as steam, from the orifice 14 during start up. Steam and other hot gasses tend to cause plugging in the tube 30. Positioning the tube 30 away from the orifice 14 allows the undesired extrudate 16 to bypass the tube 30 and prevents the undesired extrudate 16, steam, and other hot gases from plugging the tube 30. The motor 42 is generally not run during start up so that the start up extrudate 16 is not nicked. Alternatively, if the motor 42 is running, the blade positioning device 46 can position the moving nicking blade 40 such that the blade cutting radius 22 does not cover the orifice 14, and the nicking blade 40 will not nick the extrudate 16 nor interfere with the positioning of the tube 30. In this manner, the motor 42 and the nicking blade 40 can be brought up to operating speed without nicking the extrudate 16 or interfering with the positioning of the tube 30. If desired, the nicking blade 40 can be positioned by the blade positioning device 46 such that it completely cuts the extrudate 16 exiting the orifice 14. This method cuts the extrudate 16 into smaller pieces and eliminates the need for a separating device.

Figures 6A, 6B, 6C:
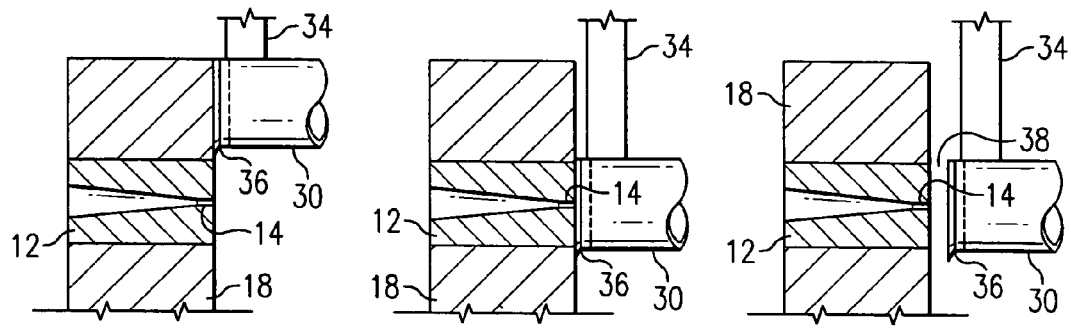
FIGS. 6A-6C are side views in elevation of the positioning of the tube from start-up through operation for one embodiment of the present invention.

FIGS. 6A-6C illustrate the process of starting up and operating one embodiment of the present invention. When the extruder reaches its operational parameters, the tube positioning device 34 positions the tube 30 so that the tube blade 36 is flush with the die face 18 (See FIG. 6A). The tube positioning device 34 then quickly slides the tube 30 across the die face 18 until the orifice 14 is within the inside diameter of the tube 30 (See FIG. 6B). When the tube blade 36 passes over the orifice 14, the tube blade 36 slices off the old extrudate 16 and allows the orifice 14 to extrude a new extrudate 16 into the tube 30, where the flapper 32 will contact the extrudate 16 and cause it to curl and form the curly puff extrudate 20.

After the tube positioning device 34 positions the tube 30 over the orifice 14, the tube positioning device 34 moves the tube 30 away from the die 12 (See FIG. 6C). Separating the tube 30 from the die face 18 creates a gap 38. The gap 38 allows gasses such as steam to escape from the expanding extrudate 16 and allows the nicking blade 40 to access the extrudate 16 as it exits the orifice 14. Gap distances of 4-8 millimeters have been found to be a good balance between containing the curling extrudate inside the tube 30, allowing the nicking blade 40 access to the extrudate 16, and allowing sufficient release of steam. It should be understood that the gap 38 may vary depending on the pressure and temperature of the extrudate 16, the back pressure created by flapper 32, and the thickness of the nicking blade 40.

Figure 7:
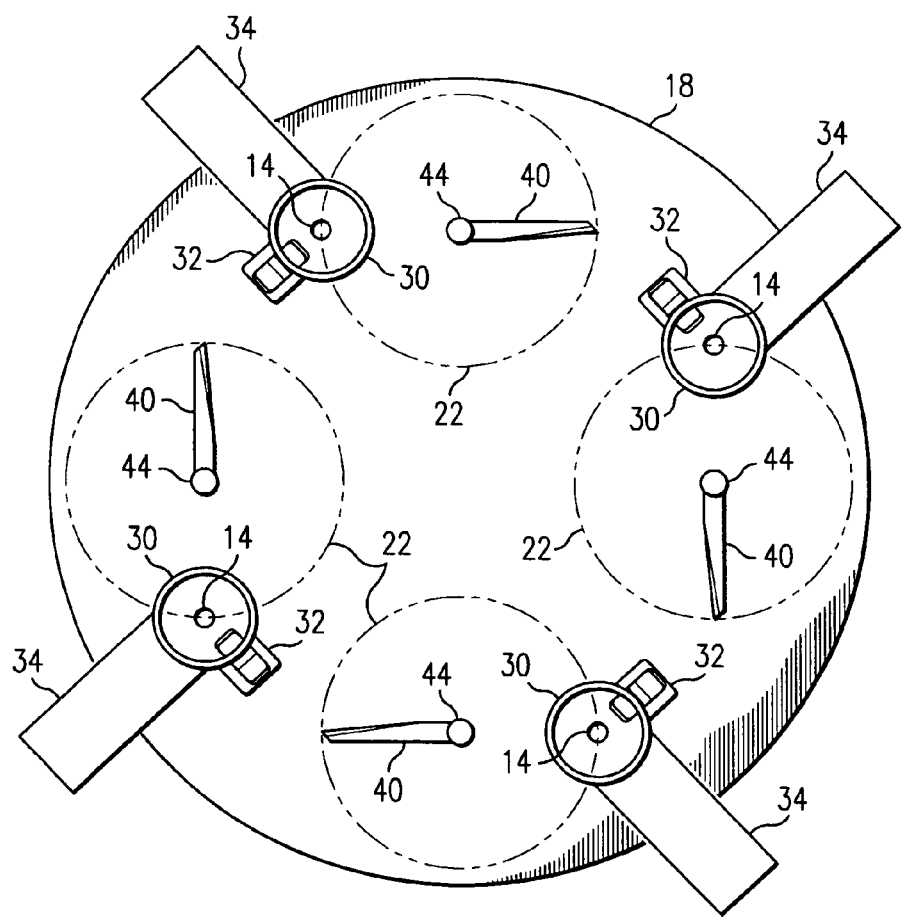
FIG. 7 is a plan view of one embodiment of the present invention incorporating a configuration utilizing a single blade for each orifice.

It should also be understood that multiple embodiments of the orifice 14, the nicking blade 40, and the tube 30 can be implemented on a single die 12. FIG. 7 is an illustration of a die 12 with four such embodiments. The blade cutting radius 22 is defined by the outer reach of the nicking blade 40 and is shown only partially covering the orifice 14. The position of the nicking blade 40 shown in FIG. 7 is preferable to other configurations, such as one in which the shaft 44 is closer to the edge of the die face 18, because the blade cutting radius 22 does not extend beyond the perimeter of the die face 18. Keeping the blade cutting radius 22 within the perimeter of the die face 18 helps prevent injury to people working in close proximity to the extruder and the die 12. During operation of a die 12 with multiple orifices 14, the extrudate 16 discharge rate may vary from one orifice 14 to another. The embodiment utilizing one nicking blade 40 for every orifice 14 is preferred because it allows an operator or automated controller to adjust the nicking blade 40 speed based on the extrudate 16 output rate and curling rate. By adjusting the speed of the nicking blade 40 to the output rate of the extrudate 16 of an individual orifice 14, the distance between the nicks on the extrudate 16 from each individual orifice 14 can be precisely controlled and thus yield curly puff extrudate 20 pieces of uniform length.

Figure 8A:
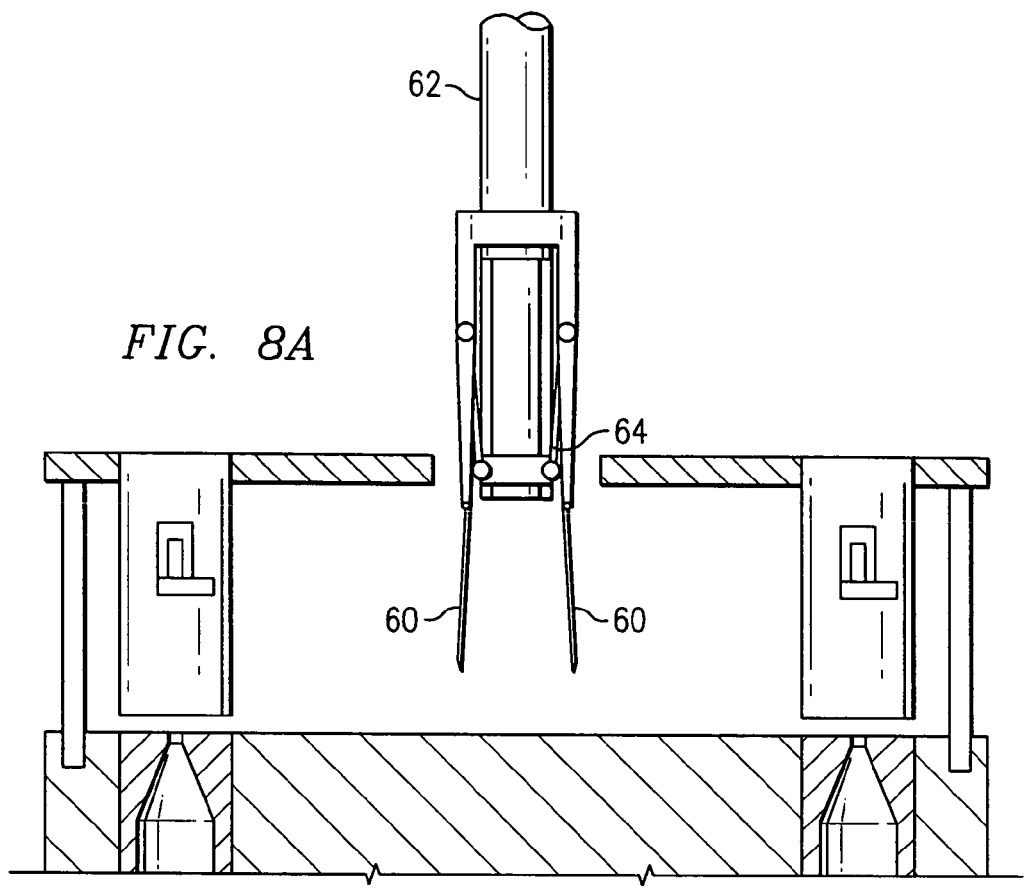
FIGS. 8A-8C are side views of one embodiment of the present invention utilizing a single nicking blade for multiple orifices.
Figure 8B:
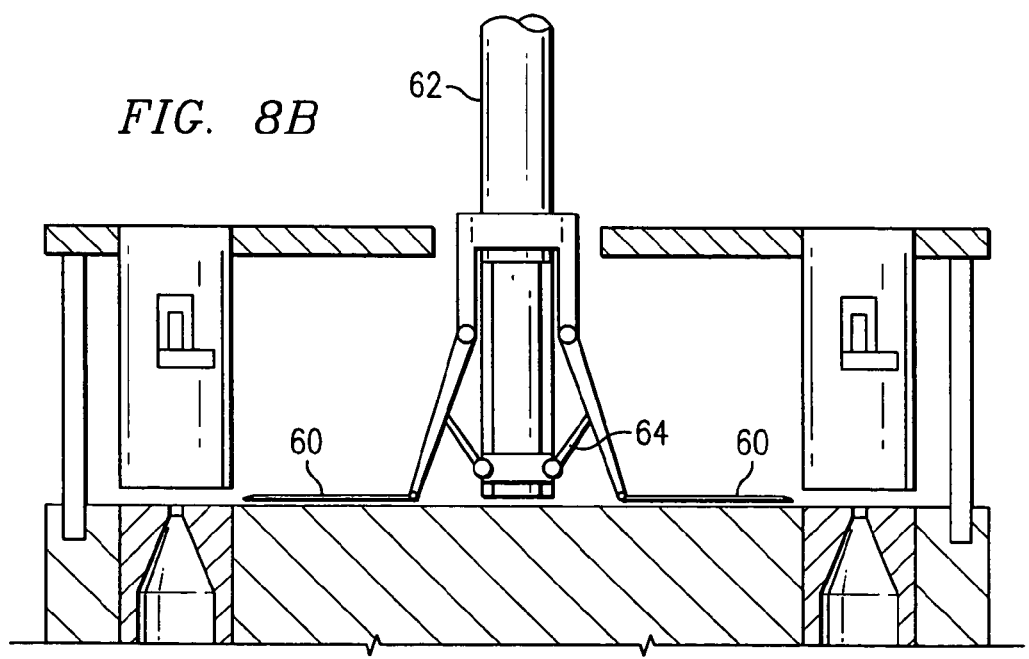
Figure 8C:
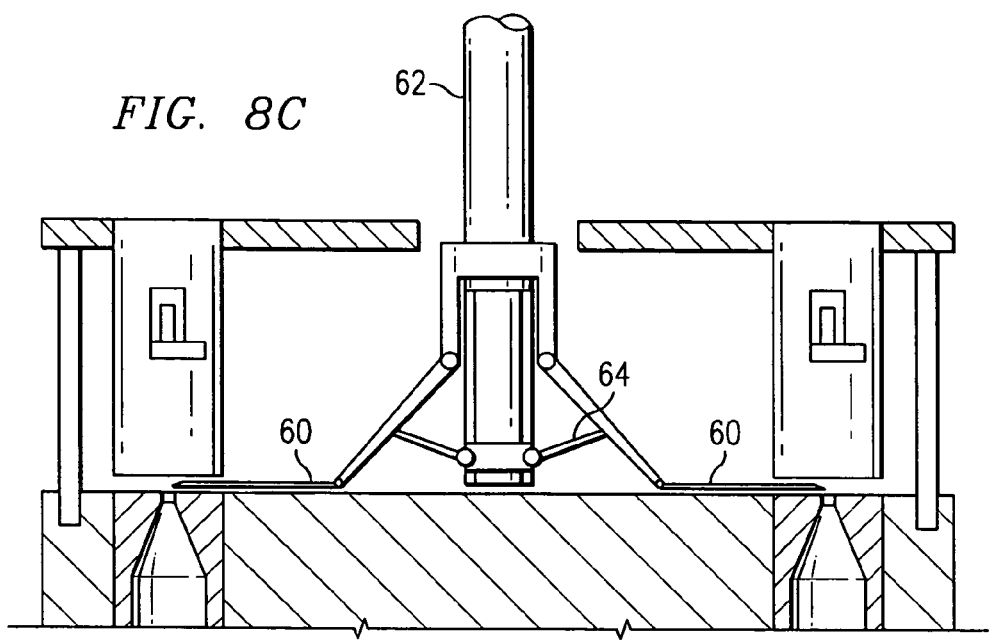

In certain situations, an embodiment utilizing a nicking blade 40 for every orifice 14 may not be necessary or preferable. In these cases, a central nicking apparatus 62, as shown in FIGS. 8A, 8B, and 8C, utilizing a central nicking apparatus positioning device (not shown), a blade positioning device 64, and at least one blade 60 can be utilized. The central nicking apparatus positioning device can move the central nicking apparatus 62 in any direction relative to the die 12. Examples of central nicking apparatus positioning devices 62 are electrical servo motors, pneumatic actuators, hydraulic actuators, and mechanical screws. A central nicking apparatus 62 like the one utilized in FIGS. 8A-8C can be used to cut or nick a plurality of orifices 14. FIGS. 8A-8C are illustrations of the process of positioning the central nicking apparatus 62 into the center of the die face 18 such that the blades 60 of the central nicking apparatus 62 are able to nick multiple orifices 14. In FIG. 8A, the central nicking apparatus 62 is positioned close to the die face 18. A motor (not shown) powers the central nicking apparatus 62. As the central nicking device 62 begins to rotate, the centrifugal force, caused by the rotation of the central nicking apparatus 62, forces opens the blades 60. The blade positioning device 64 guides the blades 60 into position such that they will be parallel with the die face 18 when completely opened. Alternatively, the blade positioning device 64 can be actuated or otherwise controlled to force the blades 60 into position. In FIG. 8B, the centrifugal force continues to expand the blades 60 and positions them adjacent to the die face 18. The nicking apparatus 62 continues to rotate so that the blades 60 are moved into position and nick the extrudates 16 exiting the orifices 14 (See FIG. 8C). The blades 60 can also be extended far enough to completely sever the extrudates 16 exiting the orifices 14.

Figure 9:
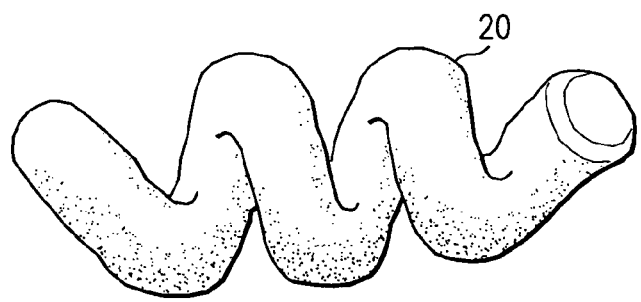
FIG. 9 is a perspective view of piece of curly puff extrudate cut with the present invention.

Referring back to FIG. 5, after exiting the tube 30, the curly puff extrudate 20 is generally transported to an oven for baking or a fryer for frying. The nicks in curly puff extrudate 20 are weaker than the rest of the curly puff extrudate 20 and, consequently, the curly puff extrudate 20 breaks into individual curly puff extrudate 20 pieces with little or no mechanical manipulation upon baking or frying. FIG. 9 is an example of a nicked curly puff extrudate 20 piece that has separated in a fryer.

Figure 10A:
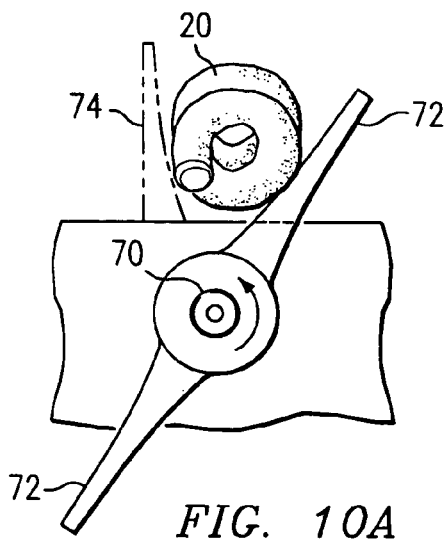
FIGS. 10A-10B are front views in elevation of the paddle wheel separator of the present invention.
Figure 10B:
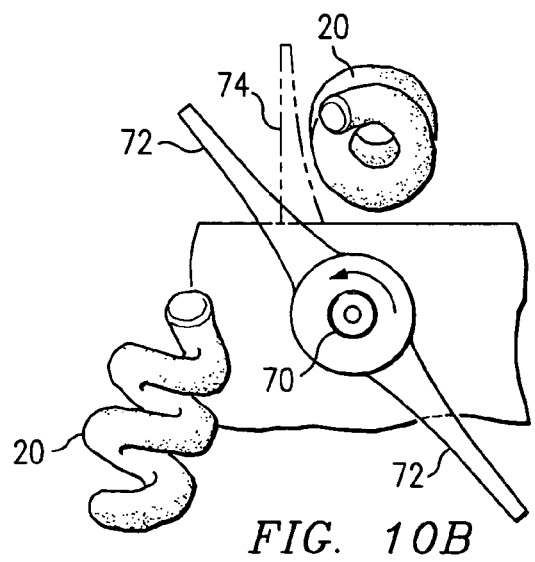

In some applications, it may be desirable to separate the individual curly puff extrudate 20 pieces prior to baking, frying, or some other processing. In that case, there are a variety of devices that can be used to separate the nicked curly puff extrudate 20. One type of separation device is a paddle wheel. FIGS. 10A and 10B are illustrations of a paddle wheel. In the embodiment disclosed in FIGS. 10A and 10B, the curly puff extrudate 20 exits the tube 30 and travels along a conveyer belt, which is parallel to the shaft 70 of the paddle wheel. The view in FIGS. 10A and 10B is that of the curly puff extrudate 20 being conveyed out of the page towards the viewer. Each paddle wheel comprises a shaft 70 connected to a motor (not shown). A plurality of paddles 72 are connected to the shaft 70. When the shaft 70 rotates, the paddles 72 come into contact the nicked curly puff extrudate 20 (FIG. 10A). By this point, the curly puff extrudate 20 has cooled sufficiently to harden. When the paddles 72 come into contact with the curly puff extrudate 20, the nicked curly puff extrudate 20 breaks at its weakest point, namely the nick. The individual curly puff extrudate 20 pieces then fall into a capture bin underneath the paddle wheel (FIG. 10B). A guide 74 keeps the curly puff extrudate 20 from repositioning itself out of the reach of the paddles 72.

It should be realized that a paddle wheel is not the only device for separating the individual curly puff extrudate 20 pieces. A tumbler could be employed to tumble the unseparated curly puff extrudate 20 until the curly puff extrudate 20 pieces break off. The curly puff extrudate 20 pieces could then be removed from the tumbler. The curly puff extrudate 20 can also be separated on a vibrating conveyer or a conveyer having steps or direction changes that facilitate product separation. Persons skilled in the art will also be aware of various other devices for separating nicked curly puff extrudate 20.

While the present invention is disclosed in reference to curly puff extrudate 20, it should be understood that the present invention could be employed with cylindrical, uniquely shaped, or any other type of extrudate 16. Additionally, the present invention can be utilized any time there is an need for cutting or nicking of a quasi-solid effluent from any type of process.

It should further be understood that more than one die 12 could be routed into a single tube 30. For example, a tube 30 can receive the extrudate 16 from two nearby orifices 14. Further, dies 12 producing any number of shapes, such as a star or square cross section or more complex shapes, such as a cactus or pepper shape, can be used with the invention.

Any number of various types of extruders can be used with the invention, including twin screw and single screw extruders of any length and operating at a wide range of rotational speeds. Further, while the process has been described with regard to a corn-based product, it should be understood that the invention can be used with any puff extrudate, including products based primarily on wheat, rice, or other typical protein sources or mixes thereof. In fact, the invention could have applications in any field involving extrusion of a material that quickly goes through a glass transition stage after being extruded through a die orifice.

While the invention has been particularly shown and described with reference to a preferred embodiment, it will be understood by those skilled in the art that various changes in form and detail may be made therein without departing from the spirit and scope of the invention.

What is claimed is:

1. An apparatus for producing an extrudate comprising:
    an extruder die comprising at least one orifice and a die face;
    a nicking device located flush with the die face
    wherein the nicking device nicks an extrudate exiting the orifice in the die; and
    a containment vessel that applies a resistance to the extrudate to produce a non-linear extrudate, wherein the extrudate remains connected when in said containment vessel.

2. The apparatus of claim 1 wherein the nicking device is a blade.

3. The apparatus of claim 2 wherein the blade nicks the extrudate while the extrudate is in a plastic melt stage.

4. The apparatus of claim 2 wherein the blade nicks the extrudate from a plurality of the orifices.

5. The apparatus of claim 1 wherein the nicking device accesses the extrudate through a gap in between the die and the containment vessel.

6. The apparatus of claim 1 further comprising a separation device; wherein the separation device separates the nicked extrudate at the nicks.

7. The apparatus of claim 6 wherein the separation device is an oven.

8. The apparatus of claim 6 wherein the separation device is a fryer.

9. The apparatus of claim 6 wherein the separation device is a paddle wheel.

10. The apparatus of claim 6 wherein the separation device is a tumbler.

11. The apparatus of claim 6 wherein the separation device is a conveyer.

12. An apparatus for producing a non-linear extrudate comprising:
    an extruder die comprising at least one orifice;
    a containment vessel located in front of the die wherein said containment vessel
    applies a resistance to the extrudate to produce a non-linear extrudate;
    a containment vessel positioning device connected to the containment vessel;
    a nicking device located in front of the die;
    a nicking device positioning device connected to the nicking device;
    wherein an extrudate exits the orifice and passes through the containment vessel;
    wherein the nicking device nicks an extrudate exiting the orifice; and
    wherein the nicking device accesses the extrudate through a gap in between the containment vessel and the die.

13. The apparatus of claim 12 wherein the nicking device is a blade.

14. The apparatus of claim 13 wherein the blade nicks the extrudate while the extrudate is in a plastic melt stage.

15. The apparatus of claim 13 wherein the blade nicks the extrudate from a plurality of orifices.

16. The apparatus of claim 12 further comprising:
wherein the containment vessel positioning device positions the containment vessel away from the orifice such that the extrudate does not pass through the containment vessel; and
wherein the containment vessel positioning device repositions the containment vessel in front of the orifice such that the extrudate passes through the containment vessel.

17. The apparatus of claim 12 further comprising:
wherein the nicking device positioning device positions the nicking device away from the orifice such that the nicking device does not nick the extrudate; and
wherein the nicking device positioning device repositions the nicking device in front of the orifice such that the nicking device nicks the extrudate.

18. The apparatus of claim 12 further comprising: a separation device; wherein the separation device separates the nicked extrudate at the nicks.

19. The apparatus of claim 18 wherein the separation device is an oven.

20. The apparatus of claim 18 wherein the separation device is a fryer.

21. The apparatus of claim 18 wherein the separation device is a paddle wheel.

22. The apparatus of claim 18 wherein the separation device is a tumbler.

23. The apparatus of claim 18 wherein the separation device is a conveyer.

* * * * *